United States Patent
Bemis et al.

(10) Patent No.: US 9,429,491 B2
(45) Date of Patent: Aug. 30, 2016

(54) COMPENSATING A SENSOR HAVING THERMAL GRADIENTS

(71) Applicant: Kulite Semiconductor Products, Inc., Leonia, NJ (US)

(72) Inventors: Andrew Bemis, Upper Saddle River, NJ (US); Timothy Nunn, Ridgewood, NJ (US); Joseph VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 85 days.

(21) Appl. No.: 14/162,108

(22) Filed: Jan. 23, 2014

(65) Prior Publication Data

US 2015/0204746 A1    Jul. 23, 2015

(51) Int. Cl.
*G01L 9/02* (2006.01)
*G01L 9/06* (2006.01)

(52) U.S. Cl.
CPC ..................................... *G01L 9/065* (2013.01)

(58) Field of Classification Search
CPC ........... G01L 9/02; G01L 9/06; G01L 9/025; G01L 9/065
USPC .................................................. 73/719, 721
See application file for complete search history.

(56) References Cited

U.S. PATENT DOCUMENTS

| | | | | | |
|---|---|---|---|---|---|
| 4,172,389 | A | * | 10/1979 | Branch | 73/766 |
| 5,410,908 | A | * | 5/1995 | Erichsen | 73/31.05 |
| 6,098,464 | A | * | 8/2000 | Avisse et al. | 73/708 |
| 6,612,179 | B1 | * | 9/2003 | Kurtz | 73/727 |

OTHER PUBLICATIONS

Author: Unknown, Title: Application Note 871, Demystifying Piezoresistive Pressure Sensors, Date: Jul. 17, 2002, Publisher: Maxim Integrated Products, Inc., pp. 1-13.*

* cited by examiner

*Primary Examiner* — Lisa Caputo
*Assistant Examiner* — Roger Hernandez-Prewit
(74) *Attorney, Agent, or Firm* — Troutman Sanders LLP; James E. Schutz; Mark Lehi Jones

(57) ABSTRACT

Example embodiments of the disclosed technology methods, devices, and systems for compensating a sensor having thermal gradients. In one embodiment, a system is provided that includes a sensor, including a first half-bridge transducer configured to output a first pressure signal associated with a first received pressure; a first set of span resistors coupled to the first half-bridge transducer, and configured generate a first compensated pressure signal; a second half-bridge transducer, configured to output a second pressure signal associated with a second received pressure; and a second set of span resistors coupled to the second half-bridge transducer and configured to generate a second compensated pressure signal. The system includes an output port that is configured to output a signal associated with a difference between the first compensated pressure signal and the second compensated pressure signal.

16 Claims, 4 Drawing Sheets

COMPENSATING A SENSOR HAVING THERMAL GRADIENTS

TECHNICAL FIELD

This disclosure generally relates to sensors and more particularly to compensating a sensor having thermal gradients.

BACKGROUND

The measurement of differential pressure is important in many applications such as those measuring oil pressures, fuel pressure, hydraulic pressure, air pressure, and the like. In many of these applications, it may not be desirable to measure differential pressure by applying different pressures to opposite sides of a sensor's diaphragm. Instead, a half-bridge sensor configuration may be used, such as described in U.S. Pat. No. 4,695,817, entitled "ENVIRONMENTALLY PROTECTED PRESSURE TRANSDUCERS EMPLOYING TWO ELECTRICALLY INTERCONNECTED TRANSDUCER ARRAYS," issued Sep. 22, 1987 to Dr. Anthony D. Kurtz et al, and assigned to Kulite Semiconductor Products, Inc., the assignee herein. This configuration has many benefits but may be susceptible to thermal gradients, since each side of the differential sensor may be physically located in different environments. In some applications, a hot liquid such as engine oil may be applied to the front half-bridge of the sensor's diaphragm, while a cool gas such as atmospheric air may be applied to the back half bridge of the sensor's diaphragm. In this case, compensating for the temperature difference between each of the sensor's diaphragm may be difficult. Typical temperature compensation of half-bridge sensors assume that both sensors are at the same temperature, so that any temperature effects may be compensated using temperature compensation techniques such as described in U.S. Pat. No. 3,245,252, entitled "TEMPERATURE COMPENSATED SEMICONDUCTOR STRAIN GAGE UNIT" issued Apr. 12, 1966 to Dr. Anthony Kurtz et al., and assigned to Kulite Semiconductor Products, Inc., the assignee herein.

FIG. 1 shows a prior art sensor 100 having thermal gradients. In FIG. 1, the sensor 100 includes a main half-bridge transducer 101, a reference half-bridge transducer 105, a single span resistor 108, a shunt resistor 109, input terminals 121 and 122 and output terminals 123 and 124. The main half-bridge transducer 101 includes piezoresistive elements 102 and 103. Similarly, the reference half-bridge transducer 105 includes piezoresistive elements 106 and 107. Each of the piezoresistive elements 102, 103, 106 and 107 may also be referred to as a leg of a Wheatstone bridge. Further, each set of the piezoresistive elements 102 and 103 and the piezoresistive elements 106 and 107 may be referred to as a piezoresistive gauge. The main half-bridge transducer 101 and the reference half-bridge transducer 105 are coupled to the single span resistor 108, which acts as a voltage divider. As a temperature of each of the main half-bridge transducer 101 and the reference half-bridge transducer 105 increases, a resistance of a piezoresistive gage of each of the main half-bridge transducer 101 and the reference half-bridge transducer 105 increases, resulting in an increase in a voltage applied to each of the main half-bridge transducer 101 and the reference half-bridge transducer 105. Thus, the use of the single span resistor 108 in this configuration compensates for a decrease in sensitivity with increasing temperature.

In FIG. 1, the shunt resistor 109 is coupled across the piezoresistive element 102 of the main half-bridge transducer 101. The shunt resistor 109 compensates for a thermal zero shift associated with the sensor 100 by shunting more current from the piezoresistive element 102 as the temperature increases and a resistance of the piezoresistive element 102 increases. This technique works well when the piezoresistive elements 102 and 103 of the main half-bridge transducer 101 and the piezoresistive elements 106 and 107 of the reference half-bridge transducer 105 are at an equivalent temperature. However, when the main half-bridge transducer 101 and the reference half-bridge transducer 105 are not at an equivalent temperature, then one of the transducers 101 and 105 will have increased resistance due to the temperature difference. The use of the shunt resistor 109 in this configuration still adjusts for a thermal zero shift between the main half-bridge transducer 101 and the reference half-bridge transducer 105, resulting in the sensor 100 having measurement errors over temperature. Accordingly, there is a need for improved techniques to allow for compensating sensors having thermal gradients. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present invention relate to compensating a sensor having thermal gradients. According to one aspect, a sensor may be configured to include a first half-bridge transducer, a second half-bridge transducer, a first set of span resistors and a second set of span resistors. The first half-bridge transducer may be configured to receive a first pressure, measure the first pressure and output a first pressure signal associated with the first pressure. Similarly, the second half-bridge transducer may be configured to receive a second pressure, measure the second pressure and output a second pressure signal associated with the second pressure. The first set of span resistors may be coupled to the first half-bridge transducer. Further, the first set of span resistors may be configured to compensate the first pressure signal for a thermal sensitivity shift of the first half-bridge transducer to generate a first compensated pressure signal. Also, a second set of span resistors may be coupled to the second half-bridge transducer. The second set of span resistors may be configured to compensate the second pressure signal for a thermal sensitivity shift of the second half-bridge transducer to generate a second compensated pressure signal. Finally, an output signal associated with a difference between the first compensated pressure signal and the second compensated pressure signal may be output from the sensor. Similarly, the transducer may have a first shunt resistor and a second shunt resistor designed to compensate for thermal zero shift.

According to another aspect, in a sensor having a first half-bridge transducer coupled to a first set of span resistors and a second half-bridge transducer coupled to a second set of span resistors, a method may include receiving, at the first half-bridge transducer, a first pressure. Further, the method may include measuring, by the first half-bridge transducer, the first pressure. The method may include outputting, by the first half-bridge transducer, a first pressure signal associated with the first pressure. Also, the method may include compensating, by the first set of span resistors, the first pressure signal for a thermal sensitivity shift of the first half-bridge transducer to generate a first compensated pressure signal. Similarly, the method may include receiving, at the second half-bridge transducer, a second pressure. Further, the method may include measuring, by the second half-bridge transducer, the second pressure. The method may include outputting, by the second half-bridge transducer, a second pressure signal associated with the second pressure. Also, the method may include compensating, by the second set of span resistors, the second pressure signal for a thermal sensitivity shift of the second half-bridge transducer to generate a second compensated pressure signal. Finally, the method may include outputting, by the sensor, an output signal associated with a difference between the first compensated pressure signal and the second compensated pressure signal. Similarly, this method may also include compensating for thermal zero shift using two shunt resistors.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
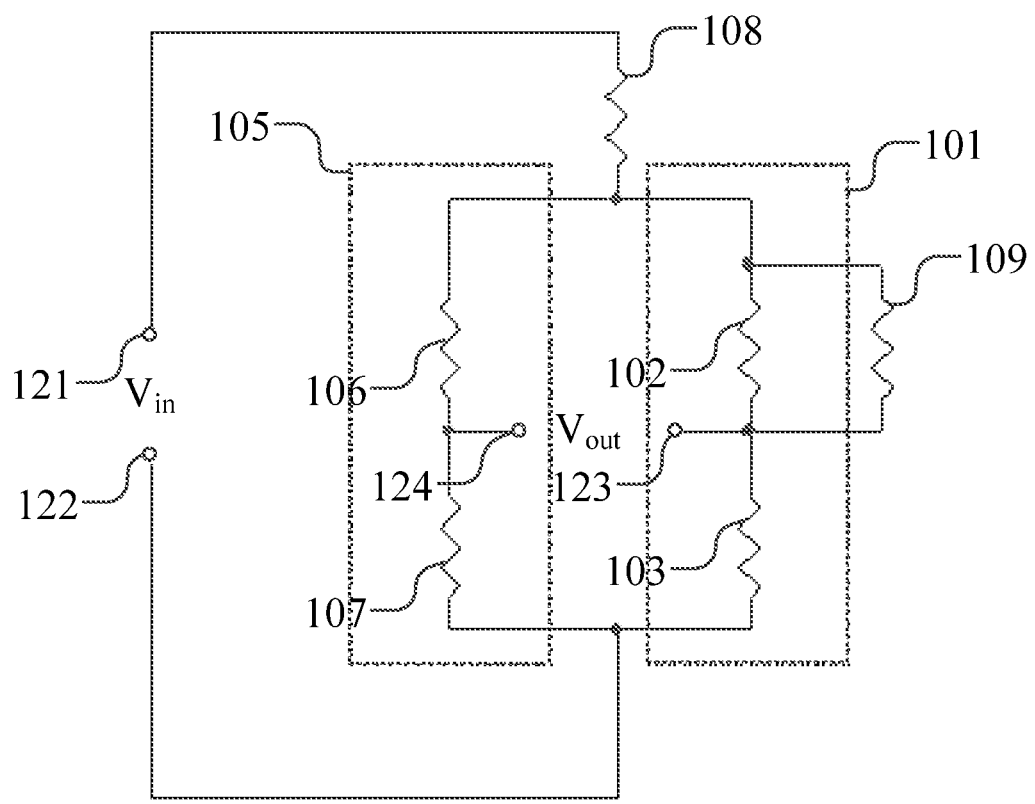
FIG. 1 illustrates a prior art sensor having thermal gradients.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for compensating a sensor having thermal gradients. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Figure 2:
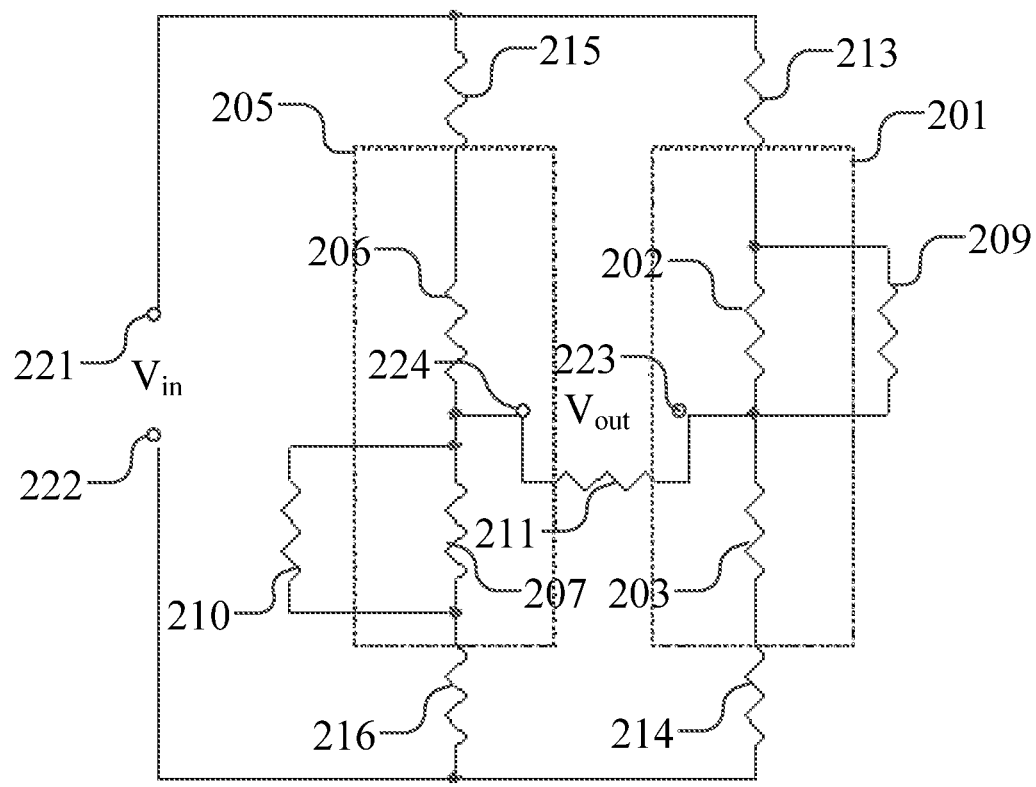
FIG. 2 shows one embodiment of a sensor designed to compensate for thermal gradients in accordance with various aspects set forth herein.

This disclosure presents compensating a sensor having thermal gradients. For instance, by compensating a sensor in accordance with various aspects described herein, an improved pressure measurement capability of a sensor having a thermal gradient is provided. For example, FIG. 2 shows one embodiment of a sensor 200 having thermal gradients in accordance with various aspects set forth herein. In FIG. 2, the sensor 200 may be configured to include a first half-bridge transducer 201, a second half-bridge transducer 205, a first shunt resistor 209, a second shunt resistor 210, a third shunt resistor 211, a first set of span resistors 213 and 214, a second set of span resistors 215 and 216, input terminals 221 and 222 and output terminals 223 and 224. The third shunt resistor 211 may also be referred to as an output shunt resistor. The first half-bridge transducer 201 may be configured to include piezoresistive elements 202 and 203. Similarly, the second half-bridge transducer 205 may be configured to include piezoresistive elements 206 and 207. Each of the piezoresistive elements 202, 203, 206 and 207 may also be referred to as a leg of a Wheatstone bridge. Further, each set of the piezoresistive elements 202 and 203 and the piezoresistive elements 206 and 207 may be referred to as a piezoresistive gauge.

In FIG. 2, a first end of the first half-bridge transducer 201 may be coupled to the span resistor 213 and a second end of the first half-bridge transducer 201 may be coupled to the span resistor 214. Similarly, a first end of the second half-bridge transducer 205 may be coupled to the span resistor 215 and a second end of the second half-bridge transducer 205 may be coupled to the span resistor 216. In this configuration, each of the first half-bridge transducer 201 and the second half-bridge transducer 205 may be separately compensated for sensitivity, thermal sensitivity shift and thermal zero shift. By compensating each transducer 201 and 205 for thermal zero shift may result in a common-mode voltage of each transducer 201 and 205 being about equivalent across its compensation range. With the common-mode voltage of each transducer 201 and 205 being about equivalent, the third shunt resistor 211 may be coupled between the transducers 201 and 205. Further, the third shunt resistor 211 may allow an output of the sensor 200 across the output terminals 223 and 224 (e.g. $V_{main}$-$V_{ref}$) to be tuned to a desired dynamic range such as full scale output. However, the third shunt resistor 211 may affect temperature compensation of the sensor 200. To overcome, the first set of span resistors 213 and 214 may be adjusted to compensate the first half-bridge transducer 201 for any effects from the third shunt resistor 211. Similarly, the second set of span resistors 215 and 216 may be adjusted to compensate the second half-bridge transducer 205 for any effects from the third shunt resistor 211.

In the current embodiment, each of the first half-bridge transducer 201 and the second half-bridge transducer 205 may be individually compensated for thermal zero shift. A thermal zero shift may be measured at the output terminals 223 and 224 of the sensor 200, such as under room conditions or an absolute vacuum, with full rated excitation, but with no pressure applied to the sensor 200. A thermal zero shift may also be referred to as zero balance, zero offset, zero pressure output, zero measurand output or the like. The first shunt resistor 209 may be used to compensate a thermal zero shift associated with the first half-bridge transducer 201. Similarly, the second shunt resistor 210 may be used to compensate a thermal zero shift associated with the second half-bridge transducer 205. Further, a circuit may be used to compensate the output voltage of the sensor 100 for various performance characteristics such as thermal zero shift, thermal sensitivity shift, sensitivity, thermal transient response, frequency response, input or output resistance, dynamic range, and the like. In one example, the circuit may include an amplifier with a gain and a balance of the amplifier being used to compensate the output voltage of the sensor 100 such as for a thermal span shift and full scale. A person of ordinary skill in the art will recognize various techniques for designing circuits to compensate for various performance characteristics.

Another benefit of this dual compensation of thermal sensitivity shift and thermal zero shift is that each of the first half-bridge transducer 201 and the second half-bridge transducer 205 may not need to be as closely matched as in prior art sensors such as the sensor 100 of FIG. 1. For instance, the sensor 100 of FIG. 1 requires closely matching the main half-bridge transducer 101 and the reference half-bridge transducer 105, since it is difficult to separately adjust a sensitivity of each transducer. In contradistinction, since the spans of the first half-bridge transducer 201 and the second half-bridge transducer 205 are independent, the first set of span resistors 213 and 214 associated with the first half-bridge transducer 201 and the second set of span resistors 215 and 216 associated with the second half-bridge transducer 205 may allow for independently compensating each transducer 201 and 205 for sensitivity. Also, since the first set of span resistors 213 and 214 associated with the first half-bridge transducer 201 and the second set of span resistors 215 and 216 associated with the second half-bridge transducer 205 control sensitivity and thermal sensitivity shift, sensitivity and thermal sensitivity shift of each transducer 201 and 205 may need to be balanced with each compensation. This method of compensation of the sensor 100 may be more complex than the prior art. However, numerical methods may be used for proper compensation. A person of ordinary skill in the art will recognize various techniques using numerical methods to perform compensation of various performance characteristics of circuits.

Figure 3:
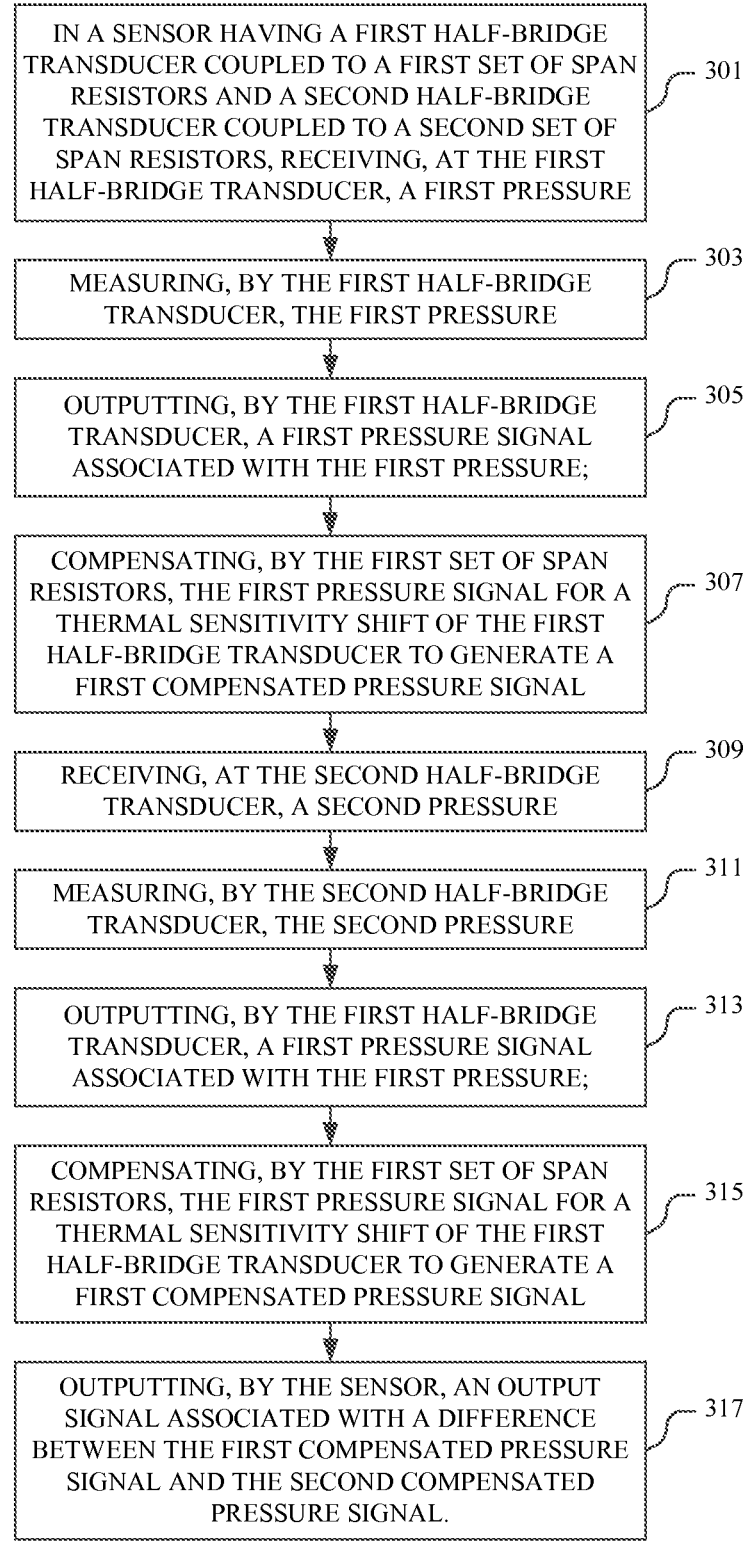
FIG. 3 is a flowchart of one embodiment of a method of compensating a sensor having thermal gradients in accordance with various aspects set forth herein.

FIG. 3 is a flowchart of one embodiment of a method 300 of compensating a sensor having thermal gradients in accordance with various aspects set forth herein. The sensor may be configured to include a first half-bridge transducer coupled to a first set of span resistors and a second half-bridge transducer coupled to a second set of span resistors. In FIG. 3, the method 300 may start, for instance, at block 301 where it may include receiving, at the first half-bridge transducer, a first pressure. Further, at block 303, the method 300 may include measuring, by the first half-bridge transducer, the first pressure. At block 305, the method 300 may include outputting, by the first half-bridge transducer, a first pressure signal associated with the first pressure. Also, at block 307, the method 300 may include compensating, by the first set of span resistors, the first pressure signal for a thermal sensitivity shift of the first half-bridge transducer to generate a first compensated pressure signal.

Similarly, at block 309, the method 300 may include receiving, at the second half-bridge transducer, a second pressure. Further, at block 311, the method 300 may include measuring, by the second half-bridge transducer, the second pressure. At block 313, the method 300 may include outputting, by the second half-bridge transducer, a second pressure signal associated with the second pressure. Also, at block 315, the method 300 may include compensating, by the second set of span resistors, the second pressure signal for a thermal sensitivity shift of the second half-bridge transducer to generate a second compensated pressure signal. At block 315, the method 300 may include outputting, by the sensor, an output signal associated with a difference between the first compensated pressure signal and the second compensated pressure signal.

In another embodiment, a method may include compensating, by a first shunt resistor of a sensor coupled to a first half-bridge transducer, a first compensated pressure signal for a thermal zero shift associated with the first half-bridge transducer.

In another embodiment, a first half-bridge transducer may include a first piezoresistive element and a second piezoresistive element. Further, a first shunt resistor may be coupled in parallel with the first piezoresistive element.

In another embodiment, a method may include compensating, by a second shunt resistor of a sensor coupled to a second half-bridge transducer, a second compensated pressure signal for a thermal zero shift associated with the second half-bridge transducer.

In another embodiment, a second half-bridge transducer may include a third piezoresistive element and a fourth piezoresistive element. Further, a second shunt resistor may be coupled in parallel with the fourth piezoresistive element.

In another embodiment, a method may include compensating, by a third shunt resistor of a sensor coupled between a first half-bridge transducer and a second half-bridge transducer, an output signal of a sensor.

In another embodiment, a method may include compensating, by a third shunt resistor, a dynamic range of an output signal of a sensor.

In another embodiment, a method may include compensating, by a third shunt resistor, an output signal of a sensor to about full scale.

In another embodiment, a method may include compensating, by a third shunt resistor, a common-mode voltage of an output signal of a sensor.

In another embodiment, a method may include compensating, by a circuit coupled to a sensor, a thermal zero shift of an output signal of the sensor.

In another embodiment, a method may include compensating, by a circuit coupled to a sensor, a dynamic range of an output voltage of the sensor.

In another embodiment, a method may include compensating, by a circuit coupled to a sensor, an output voltage of the sensor to about full scale.

In another embodiment, a first half-bridge transducer may operate at a first temperature. Further, a second half-bridge transducer may operate at a second temperature. Also, the first temperature may be different from the second temperature.

Figure 4:
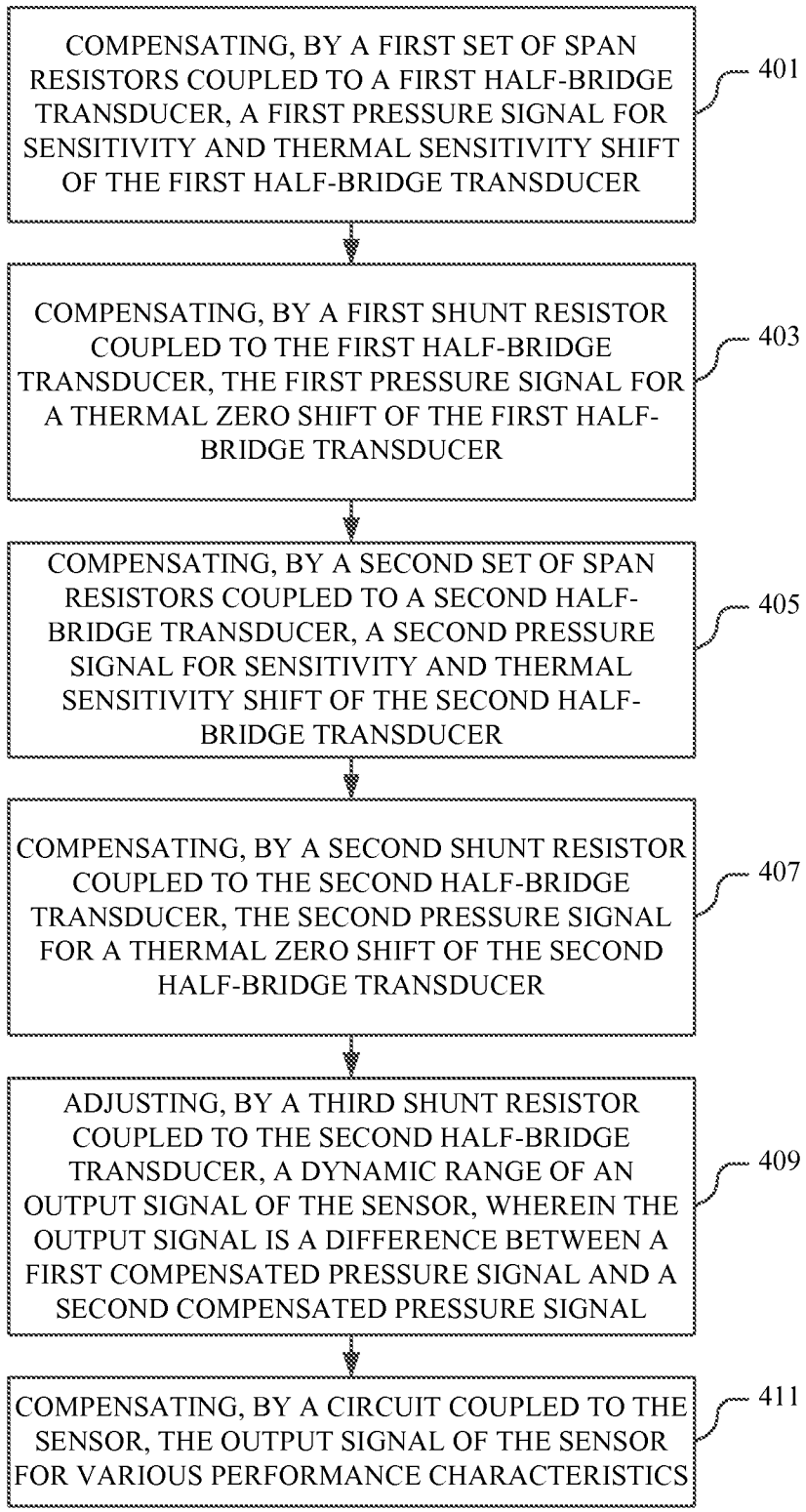
FIG. 4 is a flowchart of another embodiment of a method of compensating a sensor having thermal gradients in accordance with various aspects set forth herein.

FIG. 4 is a flowchart of another embodiment of a method 400 of compensating a sensor having thermal gradients in accordance with various aspects set forth herein. The sensor may have a structure similar to the sensor 200 in FIG. 2. Further, the sensor may be coupled to a circuit, which may be used to compensate an output signal of the sensor. In FIG. 4, the method 400 may start, for instance, at block 401, where it may include compensating, by a first set of span resistors coupled to a first half-bridge transducer, a first pressure signal for sensitivity or thermal sensitivity shift of the first half-bridge transducer to generate or update a first compensated pressure signal. Further, at block 403, the method 400 may include compensating, by a first shunt resistor coupled to the first half-bridge transducer, the first pressure signal for a thermal zero shift associated with the first half-bridge transducer to generate or update the first compensated pressure signal. Similarly, at block 405, the method 400 may include compensating, by a second set of span resistors coupled to a second half-bridge transducer, a second pressure signal for sensitivity or thermal sensitivity shift of the second half-bridge transducer to generate or update a second compensated pressure signal. Further, at block 407, the method 400 may include compensating, by a second shunt resistor coupled to the second half-bridge transducer, the second pressure signal for a thermal zero shift associated with the second half-bridge transducer to generate or update a second compensated pressure signal. In addition, at block 409, the method 400 may include compensating, by a third shunt resistor coupled to the second half-bridge transducer, a dynamic range such as full scale of an output signal of the sensor, wherein the output signal is a difference between the first compensated pressure signal and the second compensated pressure signal. At block 411, the method 400 may include compensating, by a circuit coupled to the sensor, the output signal of the sensor for various performance characteristics.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned compensation of a sensor having thermal gradients, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A system, comprising:
 a sensor, including:
  a first half-bridge transducer comprising a first voltage divider network having a first upper portion and a first lower portion, wherein the first half-bridge transducer is configured to:
   receive a first pressure;
   measure the first pressure; and
   output a first pressure signal associated with the first pressure;
  a first set of span resistors coupled to the first half-bridge transducer to provide a compensated first half-bridge transducer, wherein the first set of span resistors is configured to:
   compensate the first pressure signal for a thermal sensitivity shift associated with the first half-bridge transducer to generate a first compensated pressure signal;
  a second half-bridge transducer comprising a second voltage divider network having a second upper portion and a second lower portion, wherein the second half-bridge transducer is configured to:
   receive a second pressure;
   measure the second pressure; and
   output a second pressure signal associated with the second pressure;
  a second set of span resistors coupled to the second half-bridge transducer to provide a compensated second half-bridge transducer, wherein the second set of span resistors is configured to:
   compensate the second pressure signal for a thermal sensitivity shift associated with the second half-bridge transducer to generate a second compensated pressure signal;
  a first shunt resistor coupled to the first upper portion of the first voltage divider network of the first half-bridge transducer;
  a second shunt resistor coupled in parallel to the second lower portion of the second voltage divider network of the second half-bridge transducer; and
  an output port disposed between the compensated first half-bridge transducer and the compensated second half-bridge transducer wherein an output signal associated with the output port comprises a difference between the first compensated pressure signal and the second compensated pressure signal.

2. The system of claim 1, wherein the first shunt resistor is configured to:

compensate the first pressure signal for a thermal zero shift associated with the first half-bridge transducer.

3. The system of claim 1, wherein the first half-bridge transducer includes a first piezoresistive element and a second piezoresistive element and the first shunt resistor is coupled in parallel with at least one of the first piezoresistive element and the second piezoresistive element.

4. The system of claim 1, wherein the second shunt resistor is configured to:
compensate the second pressure signal for a thermal zero shift associated with the second half-bridge transducer.

5. The system of claim 1, wherein the second half-bridge transducer includes a third piezoresistive element and a fourth piezoresistive element and the second shunt resistor is coupled in parallel with at least one of the third piezoresistive element or the fourth piezoresistive element.

6. The system of claim 1, wherein the sensor further includes:
a third shunt resistor coupled between the first half-bridge transducer and the second half-bridge transducer, wherein the third shunt resistor is configured to:
compensate the output signal.

7. The system of claim 6, wherein the third shunt resistor is further configured to: compensate a dynamic range of the output signal.

8. The system of claim 1, wherein the first half-bridge transducer operates at a first temperature, the second half-bridge transducer operates at a second temperature and the first temperature is different from the second temperature.

9. A method, comprising:
in a sensor comprising:
a first half bridge transducer characterized by a first voltage divider network having a first upper portion and a first lower portion, with a first shunt resistor coupled to the first upper portion, the first half bridge transducer further coupled to a first set of span resistors; and
a second half bridge transducer characterized by a second voltage divider network having a second upper portion and a second lower portion, with a second shunt resistor coupled to the second lower portion, the second half-bridge transducer further coupled to a second set of span resistors, receiving, at the first half-bridge transducer, a first pressure;
measuring, by the first half-bridge transducer, the first pressure;
outputting, by the first half-bridge transducer, a first pressure signal associated with the first pressure;
compensating, by the first set of span resistors, the first pressure signal for a thermal sensitivity shift associated with the first half-bridge transducer to generate a first compensated pressure signal;
receiving, at the second half-bridge transducer, a second pressure;
measuring, by the second half-bridge transducer, the second pressure;
outputting, by the second half-bridge transducer, a second pressure signal associated with the second pressure;
compensating, by the second set of span resistors, the second pressure signal for a thermal sensitivity shift associated with the second half-bridge transducer to generate a second compensated pressure signal; and
outputting, by the sensor, an output signal associated with a difference between the first compensated pressure signal and the second compensated pressure signal.

10. The method of claim 9, further comprising:
compensating, by the first shunt resistor of the sensor, the first compensated pressure signal for a thermal zero shift and an absolute value of zero associated with the first half-bridge transducer.

11. The method of claim 9, wherein the first half-bridge transducer includes a first piezoresistive element and a second piezoresistive element and the first shunt resistor is coupled in parallel with at least one of the first piezoresistive element or the second piezoresistive element.

12. The method of claim 11, wherein the second half-bridge transducer includes a third piezoresistive element and a fourth piezoresistive element and the second shunt resistor is coupled in parallel with at least one of the third piezoresistive element and the fourth piezoresistive element.

13. The method of claim 9, further comprising:
compensating, by the second shunt resistor of the sensor, the second compensated pressure signal for a thermal zero shift and an absolute value of the zero associated with the second half-bridge transducer.

14. The method of claim 9, further comprising:
compensating, by a third shunt resistor of the sensor coupled between the first half-bridge transducer and the second half-bridge transducer, the output signal.

15. The method of claim 14, further comprising:
compensating, by the third shunt resistor, a dynamic range of the output signal.

16. The method of claim 9, further comprising:
compensating, a thermal zero shift of the output signal of the sensor.

* * * * *